June 21, 1927.

H. C. DAVIS

STEAM TRAP

Filed April 22, 1926

1,633,165

INVENTOR.
Howard C. Davis
BY
Stockbridge & Boret.
ATTORNEYS

Patented June 21, 1927.

1,633,165

UNITED STATES PATENT OFFICE.

HOWARD C. DAVIS, OF ELIZABETH, NEW JERSEY.

STEAM TRAP.

Application filed April 22, 1926. Serial No. 103,783.

My invention relates to steam traps, the object of the same being to provide a device of this kind which is extremely simple in construction and effective in operation, in which there is no multiplicity of parts to get out of order, and in which there is no possibility of scale, mud or other foreign matter lodging between the valve and seat.

A further object of the invention is to provide means for discharging the condensate as rapidly as it is formed, thereby producing a constant flow of condensate, which, in itself, prevents the water hammer so common with traps having an intermittent discharge.

A further object of the invention is to dispense with the use of valves which move toward and away from their seats and to provide a valve which is held under pressure in constant contact with its seat, in which the oscillatory movement of the valve is more or less continuous and in which the surfaces of the valve and its seat grinding upon each other tend to make the seal between the valve and its seat even closer.

Other objects of the invention will hereinafter appear, and the novel features thereof will be set forth in claims.

In the drawing forming part of this specification,

Figure 1:
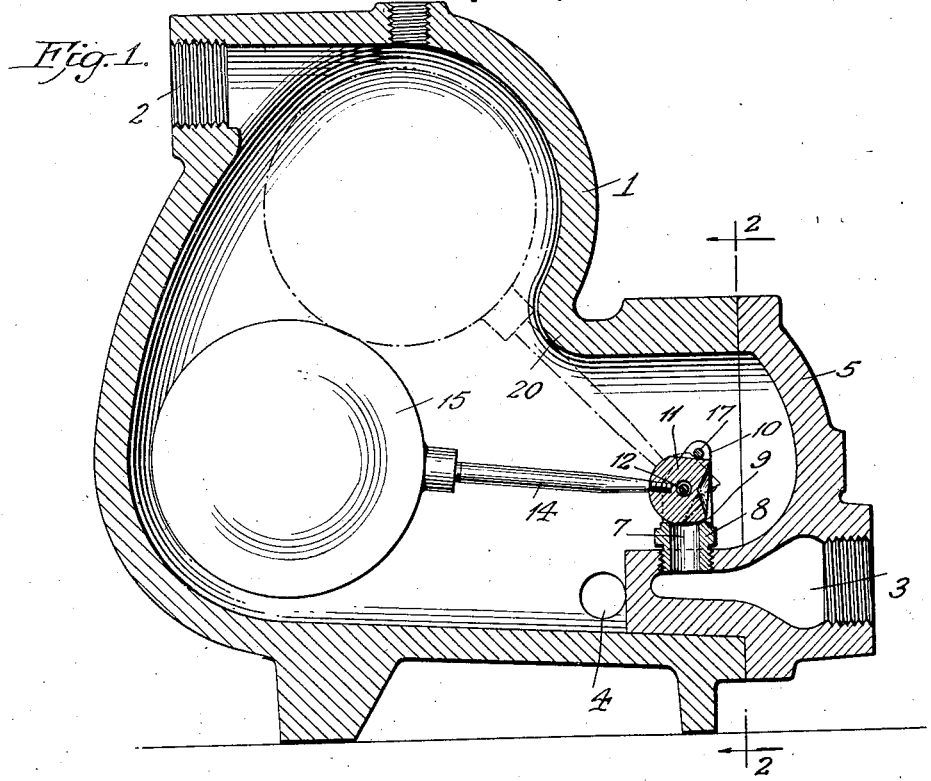
Figure 1 is a longitudinal sectional view of a steam trap embodying my invention.
Figure 2:
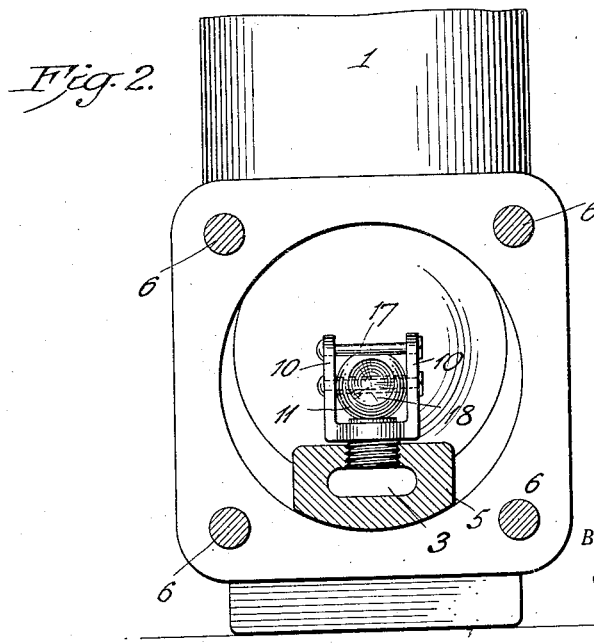
Figure 2 is a transverse section on the line 2—2 of Figure 1.
Figure 3:
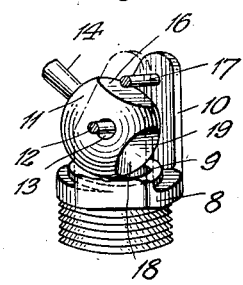
Figure 3 is a detail perspective view of the valve and its seat.

My improved trap comprises a casing 1 having an inlet opening 2 in the upper end thereof, a discharge opening 3 at the lower end thereof, and a blow-off discharge opening 4 therein. The discharge opening 3 is formed in the head 5 of the casing which is secured to the body portion thereof in any suitable manner, such as by bolts 6. The discharge opening 3 extends inwardly into the body of the casing beyond the joint between said body and the head 5, and communicates with a passage 7 in a threaded plug 8 which screws into a correspondingly threaded aperture in the extension on the head 5 into which the opening 3 extends.

The plug 8 has an annular valve seat 9 therein, and connected with said plug and extending upwardly on opposite sides of the seat 9 are the parallel uprights or walls 10, 10 which constitute a housing for the valve 11. This valve is mounted for oscillation between the uprights 10, 10 upon a pin 12 which fits loosely within a diametrical opening 13 extending through the valve. The valve is guided in its oscillatory movements on the valve seat 9 by the pin 12, but the looseness of the connection between the pin and the valve permits of a slight freedom of movement on the part of the latter. Secured to the valve 11 through a stem 14 is a ball float 15. The stem 14 extends axially from the valve 11 at right angles to the opening 13 therein. The valve 11 is generally spherical in shape, but the upper side thereof is formed with a flat face 16 which is adapted to engage a pin 17, connecting the uprights 10, when the ball float 15 approaches the bottom of the casing 1. It is also provided with a recess 18 located on the side thereof opposite the point of attachment of the float stem 14. This recess forms a sharp edge 19 with the outer surface of the valve.

When the float 15 is in its lowermost position, the valve 11 is closed. That is, the spherical portion of the surface of said valve is in contact with all parts of the seat 9. It is thus possible for steam to condense and condensate to collect in the casing 1. For the efficient operating of any heating apparatus it is necessary that the heating surface be kept free from condensate. This can only be done by discharging the condensate as rapidly as it is formed. As the water of condensation collects in the casing 1, the float 15 will rise. As it does so it oscillates the valve 11 so as to expose a portion of the valve seat 9 by bringing the recess 18 over the same. This opens up communication between the interior of the casing and the discharge outlet 3. The pressure in said casing immediately causes the discharge of a portion of the condensate therein, and the float 15 falls and again moves the valve 11 to its closing position. This action is repeated and the adjustment of the parts is such that the casing 1 is kept practically free from condensate at all times. Sufficient water of condensation, however, is allowed to remain in the casing to cover the seat 9 and a portion, at least, of the valve 11, so that a water seal is formed between the valve and its seat. The valve is held tightly against the seat by the internal pressure within the casing. Although the intermittent oscillating movement of the valve 11 is more or less continuous, the wear on the valve 11 and its seat 9 is practically nil, and what there is is unimportant, as the surfaces moving in contact with each other merely tend to make the seal between the valve and its seat even closer. The valve action is very powerful due to the large unbalanced float displacement, long leverage and low angularity of the lever at the working water level. For this reason the valve cannot stick or become sluggish under unbalanced pressure, while the extra power, in connection with the sharp cutting edge 19 of the recess in the ball shears off any foreign particles that tend to stick in and choke the valve. The wiping action at each oscillation further brushes away any particles that would otherwise tend to get between and destroy the valve surfaces. No live steam can escape as the condensate never entirely leaves the trap and the valve is always water sealed. The spherical surface of the valve, wearing upon the cylindrical edge of the port or seat, continues to make a perfect seat for itself. Even after long wear it still has a knife edge and makes tight contact, thus keeping a perfect seal in addition to the water seal which is always present in the trap.

There is no danger of the float 15 being damaged by hitting against the walls of the casing as the construction will not permit it to strike the body of the trap at any point. Upon the upward movement of the float 15 the stem 14 thereof comes in contact with an inwardly extending protection 20 in the upper wall of the casing 1, thus protecting the float by preventing it from striking against the casing. The pin 12, upon which the valve 11 is mounted, has ample clearance in the opening 13 through the valve to take up any side motion of the float. The float is thus prevented from chafing itself on the sides of the trap. And the pin 17, with which the flat face 16 of the valve 11 engages, when the float 15 approaches its lowermost position, prevents the float from pounding on the bottom of the trap.

From the foregoing description it will be seen that my improved trap is extremely simple in construction and efficient in operation. Due to its simplicity the valve does not lift off its seat and there are few possibilities of internal trouble.

While I have described my invention in its preferred form, it is obvious that many changes may be made in the details of the construction without departing from the nature or spirit of the invention. I do not wish to be limited, therefore, to any of the details of construction shown and described, except in accordance with the appended claims.

I claim:

1. In a steam trap, an annular valve seat surrounding a discharge passage, uprights on opposite sides of said seat, a spherical valve having a portion thereof cut away and an axial opening extending therethrough, a pin of smaller diameter than said opening connecting said uprights and extending loosely through said opening, and means actuated by variations in the level of the water in said trap for oscillating said valve on its seat to open and close said discharge passage.

2. In a steam trap, an annular valve seat surrounding a discharge passage, a spherical valve having a portion thereof cut away to act as a means for opening communication between the interior of the trap and said discharge opening and having another portion thereof cut away to form a flat face, a float axially connected to said valve and a stop adapted to be engaged by the flat face of said valve for limiting downward movement of the float.

3. In a steam trap, an annular valve seat surrounding a discharge passage, uprights on opposite sides of said seat, a spherical valve fitting between said uprights having an axial opening therein, having a cut-away portion adapted to open communication between the interior of the trap and said discharge passage and having a flat face, a pin connecting said uprights and passing loosely through the opening in said valve, a float axially connected to said valve at right angles to the opening therein, and a second pin connecting said uprights and adapted to be engaged by the flat face on said valve for limiting the downward movement of the float.

4. In a steam trap, an annular valve seat surrounding a discharge passage, a spherical valve having an axial opening therein, a pin for restraining unlimited movement passing loosely through said opening and having a portion thereof cut away to open communication between the interior of the trap and said discharge passage, a float axially connected to said valve whereby, due to variations in the level of the water in said trap, said valve is oscillated on its seat, and means for limiting the movements of said float in opposite directions for preventing the float from striking against the walls of the trap.

5. In a steam trap, an annular valve seat surrounding a discharge passage, uprights on opposite sides of said seat, a spherical valve fitting between said uprights having an axial opening therein, having a cutaway portion adapted to open communication between the interior of the trap and said discharge passage, and having a flat face adapted to cooperate with a stop to limit the movement of said valve, a pin connecting said uprights and passing loosely through the opening in said valve, a float axially connected to said valve at right angles to the opening therein whereby due to variations in the level of the water in said trap said valve is oscillated on its seat to open and close said discharge passage.

In witness whereof, I hereunto subscribe my signature.

HOWARD C. DAVIS.